(12) United States Patent
Oates

(10) Patent No.: US 9,707,603 B2
(45) Date of Patent: Jul. 18, 2017

(54) SYSTEM AND METHOD FOR PURGING CONTAMINANTS FROM A SALT CAVERN

(71) Applicant: Rommel M. Oates, Spring, TX (US)

(72) Inventor: Rommel M. Oates, Spring, TX (US)

(73) Assignee: Praxair Technology, Inc., Danbury, CT (US)

(*) Notice: Subject to any disclaimer, the term of this patent is extended or adjusted under 35 U.S.C. 154(b) by 66 days.

(21) Appl. No.: 14/501,215

(22) Filed: Sep. 30, 2014

(65) Prior Publication Data

US 2016/0089705 A1    Mar. 31, 2016

(51) Int. Cl.
| | |
|---|---|
| *B09C 1/02* | (2006.01) |
| *B65G 5/00* | (2006.01) |
| *B09C 1/00* | (2006.01) |
| *C01B 3/02* | (2006.01) |
| *C01B 3/50* | (2006.01) |
| *C01B 3/52* | (2006.01) |

(52) U.S. Cl.
CPC ............ *B09C 1/02* (2013.01); *B09C 1/002* (2013.01); *B65G 5/00* (2013.01); *C01B 3/02* (2013.01); *C01B 3/50* (2013.01); *C01B 3/52* (2013.01); *B09C 2101/00* (2013.01); *Y02E 60/322* (2013.01)

(58) Field of Classification Search
CPC .. B65G 5/00; B09C 1/02; B09C 1/002; B09C 2101/00; B01D 2256/16; C01B 3/02; C01B 3/50; C01B 3/52
See application file for complete search history.

(56) References Cited

U.S. PATENT DOCUMENTS

| | | | |
|---|---|---|---|
| 2,878,165 | A | 3/1959 | Cottle |
| 3,438,203 | A | 4/1969 | Lamb et al. |
| 3,684,022 | A | 8/1972 | Peterson |
| 3,807,181 | A | 4/1974 | Kuhne |
| 4,025,321 | A | 5/1977 | Anderson et al. |
| 4,117,684 | A | 10/1978 | Hendrix |
| 4,183,369 | A | 1/1980 | Thomas |
| 4,353,214 | A | 10/1982 | Gardner |

(Continued)

FOREIGN PATENT DOCUMENTS

| | | |
|---|---|---|
| JP | 58 191399 A | 11/1983 |
| WO | WO 02/097321 A1 | 12/2002 |

OTHER PUBLICATIONS

Breele, Y. et al. "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016/0360-3199(79)90005-3 (retrieved on Jan. 1, 1979) p. 297-p. 299; Figure 2.

(Continued)

*Primary Examiner* — John Kreck
*Assistant Examiner* — Carib Oquendo
(74) *Attorney, Agent, or Firm* — Nilay S. Dalal

(57) ABSTRACT

A novel system and method for removing contaminants in a salt cavern is provided. A purge fluid is used to purge one or more contaminants from the cavern on a continuous or intermittent basis before or during operation of the cavern. The cavern can be cycled one or more times with purging operations to create a cleaner cavern less susceptible to contaminating stored hydrogen during the operational lifetime of the cavern.

24 Claims, 7 Drawing Sheets

(56) References Cited

U.S. PATENT DOCUMENTS

| | | | |
|---|---|---|---|
| 4,365,978 | A | 12/1982 | Scott |
| 4,444,727 | A | 4/1984 | Yanagihara et al. |
| 4,577,999 | A | 3/1986 | Lindorfer et al. |
| 4,592,677 | A | 6/1986 | Washer |
| 4,626,131 | A | 12/1986 | Glew et al. |
| 4,725,381 | A | 2/1988 | Pinto |
| 4,830,056 | A | 5/1989 | Chamberlain |
| 5,511,905 | A | 4/1996 | Bishop et al. |
| 5,526,280 | A | 6/1996 | Consadori et al. |
| 5,669,734 | A | 9/1997 | Becnel, Jr. et al. |
| 5,842,519 | A | 12/1998 | Sydansk |
| 6,080,306 | A | 6/2000 | Falkner |
| 6,503,299 | B2 | 1/2003 | Baksh et al. |
| 6,511,528 | B1 | 1/2003 | Lansbarkis et al. |
| 6,576,138 | B2 | 6/2003 | Sateria et al. |
| 6,581,618 | B2 | 6/2003 | Hill et al. |
| 6,880,348 | B2 | 4/2005 | Bishop et al. |
| 7,078,011 | B2 | 7/2006 | Morrow et al. |
| 7,152,675 | B2 | 12/2006 | Heard |
| 7,438,079 | B2 | 10/2008 | Cohen et al. |
| 8,425,149 | B2 | 4/2013 | Drnevich |
| 8,690,476 | B2 | 4/2014 | Oates |
| 8,757,926 | B2 | 6/2014 | Drnevich |
| 8,950,419 | B2 | 2/2015 | Oates et al. |
| 9,109,418 | B1 | 8/2015 | Norris |
| 2004/0123738 | A1 | 7/2004 | Spencer |
| 2005/0220704 | A1 | 10/2005 | Morrow et al. |
| 2006/0150640 | A1* | 7/2006 | Bishop .................... F17C 1/007 62/53.1 |
| 2006/0216811 | A1 | 9/2006 | Cunningham et al. |
| 2009/0010714 | A1 | 1/2009 | Bishop |
| 2009/0028644 | A1 | 1/2009 | Lourenco et al. |
| 2009/0184517 | A1 | 7/2009 | Mukai |
| 2010/0101789 | A1 | 4/2010 | Dickinson et al. |
| 2010/0163804 | A1 | 7/2010 | Schenck |
| 2010/0200229 | A1 | 8/2010 | Jefferd |
| 2011/0305515 | A1 | 12/2011 | Drnevich |
| 2012/0259471 | A1 | 10/2012 | De Ridder |
| 2013/0213479 | A1 | 8/2013 | Oates et al. |
| 2013/0315669 | A1 | 11/2013 | Oates |
| 2013/0336721 | A1 | 12/2013 | McBride et al. |
| 2014/0161533 | A1 | 6/2014 | Oates |
| 2014/0241802 | A1 | 8/2014 | Drnevich |
| 2015/0101672 | A1 | 4/2015 | Oates et al. |
| 2015/0185716 | A1 | 7/2015 | Wichmann et al. |
| 2016/0060038 | A1 | 3/2016 | Oates |
| 2016/0089705 | A1 | 3/2016 | Oates |

OTHER PUBLICATIONS

Foh, Stephen et al., "Underground Hydrogen Storage—Final Report". Inst. of Gas Tech., DOE, Brookhaven Natl Lab, Upton, NY (Dec. 1979).
Foh, Stephen et al., "Underground Hydrogen Storage—Final Report". Inst. of Gas Tech., DOE, Brookhaven Natl Lab, Upton, NY (Dec. 1979) Extracted Pages: Title, iii, 60, 61, 77, 80 & 81.
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.
Mahoney, J.J. and Strachan, D.M. "Reduction of Sulfate by Hyrogen in Natural Systems: A Literature Review", Pacific Northwest Laboratory, Richland, VA (Jan. 1987, Rev. Jan. 1988).
Pottier, J.D. et al. "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-pp. 170; Figures 1-3, 8.
Rezunenko et al. "Constructive and Operation of Rock-Salt Underground Helium Concentrate Storage", SMRI Fall Meeting (Oct. 3-6, 1999).

Thoms, R. L. and Gehle, R.M. "A Brief History of Salt Cavern Use", Keynote Speech at Salt 2000 Conference (2000) no month.
Venter, R.D. et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10. 1016/S0360-3199(96)00210-8, p. 791-pp. 793; Tables 1, 2.
Parks, G.D., 2007, ChevronPhillips Hydrogen Cavern Clemens Terminal, www.internationalpipelineconference.com/presentation_Files/1030_PARKS-Clemens_Release-Final.ppt.zip
ConocoPhilips. As of Jun. 2007.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.
USPTO Case IPR2015-01071, Patent Trial and Appeal Board Decision, Institution of Inter Partes Review, U.S. Pat. No. 7,078,011 B2.
USPTO Case IPR2015-01072, Patent Trial and Appeal Board Decision, Institution of Inter Partes Review, U.S. Pat. No. 7,078,011 B2.
USPTO Case IPR2015-01073, Patent Trial and Appeal Board Decision, Institution of Inter Partes Review, U.S. Pat. No. 7,078,011 B2.
USPTO Case IPR2015-01074, Patent Trial and Appeal Board Decision, Denying Institution of Inter Partes Review, U.S. Pat. No. 8,690,476 B2.
USPTO Case IPR2015-01075, Patent Trial and Appeal Board Decision, Denying Institution of Inter Partes Review, U.S. Pat. No. 8,690,476 B2.
Valenti, Richard M., Compressed Air Energy Storage (CAES) Act, KCC Rule Development, Kansas Corporation Commission, KCC Open Meeting, Issue 3—Final (Jun. 16, 2010) 49 pages.
"Hydrogen Reliability Salt Cavern Case Study" Oil Sands Heavy Oil Technologies Conference and Exhibition—Jul. 14-16, 2009, Alberta Canada, available at <http://www.slideshare.net/chojsm1/hydrogen-reliability-cavern-storage>; Published Jul. 20, 2009 ("Slides").
Praxair Extending Hydrogen Pipeline in Southeast Texas—Oil & Gas Journal, vol. 90(34) (1992) (Praxair pipeline).
2006 International Pipeline Conference materials.
16 Tex. Admin. Code§ 3.97 (2007); Id. (1994).
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Examiners Report and Proposal for Decision, Jul. 28, 2004 ("Permit Review").
Moss Bluff Storage Cavern, Operations and Maintenance Manual, Sep. 16, 2003 ("Ops Manual").
H2 Salt Dome Storage System PFD, Sep. 9, 2003 ("PFD").
Praxair, Inc. Mechanical Integrity Test, Hydrogen Storage Cavern#1, Sabine Storage 7 Operations, Inc. Project 11-640, Jan. 10, 2012 ("5YR MIT").
Stolten, Detlef, ed. Hydrogen and fuel cells: fundamentals, technologies and applications. John Wiley & Sons, 2010 ("Stolten").
Prudential Equity Group Conference, Speaker: Stephen F. Angel, Executive Vice President, Sep. 22, 2005, <http://www.praxair.com/investor-relations/reports-filings-and-presentations/investor-presentations>.
Praxair Commercializes Industry's Only Hydrogen Storage, Oct. 22, 2007 <http://www.praxair.com/news/2007/praxair-commercializes-industrys-only-hydrogen-storage>.
Investment in Gulf Coast to expand facilities and services, Oct. 25, 2007 <http://www.gasworld.com/investment-in-gulf-coast-to-expand-facilities-and-services/2146.article>.
Technology Tutorial by Dr. Joe L. Ratigan ("Technology Tutorial") No date available.

(56) References Cited

OTHER PUBLICATIONS

D.J. Evans. 2007. An appraisal of Underground Gas Storage technologies and incidents, for the development of risk assessment methodology. British Geological Survey Open Report, OR/07/023. 287 pp. ("BGS").

Nieland JD. (2008). Salt cavern Thermodynamics-Comparison Between Hydrogen, Natural Gas and Air Storage. SMRI Fall Meeting, Austin, Texas, 215-234.

Tek, M. R. (1996). Natural gas underground storage: inventory and deliverability. PennWell Publishing. ISBN: 0878146148; ISBN—13:9780878146147 ("Tek").

CGA G-5.3:1997 Commodity Specification for Hydrogen, Fourth Edition, by Compressed Gas Association, Inc. ("CGA Spec").

Handbook of Compressed Gases (Van Nostrand Reinhold Company)—Hardcover (1990), by Compressed Gas Association, Compressed Gas Association Staff, 3rd ed., ISBN: 0442218818,ISBN—13: 9780442218812 ("CGA Handbook").

"Marks' Standard Handbook for Mechanical Engineers," 9th Edition (1987) (pp. 7-18-7-19); Publisher: The McGraw-Hill Companies; ISBN: 007004127X; ISBN—13: 9780070041271.

"Performance of Palladium Diffusers for Reliable Purification"; (2002) Extended abstract of a paper presented at CS-MAX, San Jose, CA, Nov. 11-13 (pp. 141-143). ("Funke").

Kelley, J.H., and R. Hagler, Storage, transmission and distribution of Hydrogen, Int. J. Hydrogen Energ., 5, 35-54, 1980 ("Kelly").

IPR No. 2015-01074, filed Apr. 18, 2015.
IPR No. 2015-01075, filed Apr. 18, 2015.
IPR No. 2015-01071, filed Apr. 18, 2015.
IPR No. 2015-01072, filed Apr. 18, 2015.
IPR No. 2015-01073, filed Apr. 18, 2015.
IPR No. 2016-01079, filed May 20, 2016.

USPTO Case IPR No. 2015-01071, Patent Trial and Appeal Board Final Written Decision, U.S. Pat. No. 7,078,011 B2.

USPTO Case IPR No. 2015-01072, Patent Trial and Appeal Board Final Written Decision, U.S. Pat. No. 7,078,011 B2.

USPTO Case IPR No. 2015-01073, Patent Trial and Appeal Board Final Written Decision, U.S. Pat. No. 7,078,011 B2.

\* cited by examiner

SYSTEM AND METHOD FOR PURGING CONTAMINANTS FROM A SALT CAVERN

FIELD OF THE INVENTION

The present invention relates to a novel system and method for purging contaminants from a salt cavern. Particularly, the process involves purging at least a portion of contaminants from the interior region of the salt cavern during construction, start-up and/or operation of the cavern to reduce a concentration of one or more of the contaminants contained therewithin.

BACKGROUND OF THE INVENTION

Hydrogen is supplied to customers connected to a hydrogen pipeline system. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream.

Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Having a storage facility in connection with hydrogen pipeline operations to supply back-up hydrogen to the pipeline supply is therefore desirable. Considering that hydrogen production plants on average have production capacities that are roughly 50 million standard cubic feet per day or greater, a storage facility for hydrogen that would allow a plant to be taken off-line, to be effective, would need to have storage capacity in the order of 1 billion standard cubic feet or greater.

Additionally, there are instances in which customer demand can exceed hydrogen production capacity of existing plants. The storage facility allows excess hydrogen to be temporarily stored and subsequently available for back-up supply to assist in meeting customer demand when, for example, a steam methane reformer is unable to meet customer demand.

The large storage capacity can be met by means of salt caverns to store the hydrogen underground. Salt caverns are large underground voids that are formed by adding fresh water to the underground salt, thus creating brine, which is often referred to as solution mining. Caverns are common in the gulf states of the United States where demand for hydrogen is particularly high. Hydrogen storage has taken place where there are no purity requirements or less stringent (<95% purity) requirements placed upon the hydrogen product. In such case, the stored hydrogen from the salt cavern can be removed from the salt cavern without further processing.

However, utilizing a salt cavern to assist in the supply of higher purity hydrogen of at least 95% purity or greater is challenging. Stored hydrogen within the salt cavern has a tendency to become contaminated by intrusion of several contaminants, which can include, by way of example, water vapor, hydrocarbons (e.g., methane), sulfur-containing compounds and/or carbon dioxide. Contamination of the stored hydrogen requires removal of one or more contaminants from the stored hydrogen when withdrawn as a crude hydrogen stream from the salt cavern. The term "crude hydrogen" is intended to refer to one or more of the contaminants contained within a salt cavern which infiltrates through the walls of the salt cavern into the stored hydrogen to a degree where subsequent purification may be required prior to its return to a hydrogen pipeline to acquire a hydrogen purity level at or below a product purity specification. Methods have been implemented to ensure that impurities imparted by the salt cavern to the stored hydrogen do not deleteriously impact the hydrogen product in the pipeline. For example, U.S. Pat. No. 7,078,011 removes at least carbon dioxide and water vapor from a crude hydrogen stream withdrawn from a salt cavern to produce a hydrogen product stream having an impurity level at or below a product purity specification. U.S. Patent Pub. No. 2013/021349 removes crude hydrogen from a salt cavern and then dilutes the crude hydrogen with higher purity hydrogen from a hydrogen pipeline to form a resultant hydrogen product stream at or below a product purity specification. U.S. Pat. Nos. 8,425,149 and 8,757,926 and U.S. Patent Publication No. 2014/0241802 maintain a minimum quantity of stored hydrogen within the salt cavern to create a stagnant layer having carbon dioxide contained therein. The compressed hydrogen feed stream is introduced into the salt cavern and the stored hydrogen stream is withdrawn from the salt cavern without disturbing the stagnant layer to prevent carbon dioxide contamination transferring into the stored hydrogen stream, thereby allowing the stored hydrogen stream to be reintroduced into the hydrogen pipeline without carbon dioxide removal. Application Ser. No. 14/475,120 discloses a system and method for cooling a crude hydrogen stream that is withdrawn from the salt cavern to condense and separate the contaminants from the hydrogen. These methods disclosed in U.S. Patent Publication No. 2013/021349; U.S. Patent Publication No. 2014/0241802; U.S. Pat. Nos. 7,078,011; 8,425,149; 8,757,926; and Ser. No. 14/475,120, each of which is incorporated by reference herein in its entirety, require additional processing steps, which can add complexity to the hydrogen flow network that is in communication with the salt cavern, as well as potentially increase capital and operating expenditures.

Additionally, the ability to utilize a salt cavern to assist in the supply of higher purity hydrogen without leakage through the salt cavern walls is difficult based on the properties of hydrogen. Hydrogen is the smallest and lightest element within the periodic table of elements, having an atomic radius measuring 25 pm+/−5 pm. Consequently, higher purity hydrogen is typically considered one of the most difficult elements to contain within underground salt formations without measurable losses through the salt cavern walls. For example, storing large quantities (e.g., greater than 100 million standard cubic feet) of pure (e.g., 99.99%) gaseous hydrogen in underground salt caverns consisting of a minimum salt purity of 75% halite (NaCl) or greater without measurable losses of the stored hydrogen-from the salt cavern can present challenges. Methods for containing hydrogen within a salt cavern have been addressed. U.S. Pat. No. 8,690,476, which is incorporated by reference herein in its entirety, creates a permeation barrier along the walls of the cavern that allows high purity hydrogen to be stored therein. U.S. Patent Pub. No. 2014/0161533, which is incorporated by reference herein in its entirety, discloses monitoring and regulating the pressure of the stored hydrogen in the salt cavern between a predetermined lower limit and a predetermined upper limit.

As will be discussed, among other advantages of the present invention, an improved system and method for purging contaminants from a salt cavern is disclosed.

SUMMARY OF THE INVENTION

The invention relates, in part, to a method and system for purging contaminants during operation of the cavern without imparting significant contaminants to the stored hydrogen.

In a first aspect, a method for removing one or more contaminants from a hydrogen salt cavern is provided, comprising: introducing purge fluid from a purge fluid reservoir into an interior region of the salt cavern; purging at least a portion of said one or more contaminants from the interior region of the cavern with the purge fluid; and returning the purge fluid with at least a portion of said one or more contaminants to the purge fluid reservoir; whereby the concentration of said one or more contaminants within the interior region of the salt cavern is reduced by an amount sufficient to reduce the required purification or dilution of a hydrogen stream withdrawn from the salt cavern in comparison to a crude hydrogen stream withdrawn from a cavern not subject to purging.

In a second aspect, a system for purging a salt cavern is provided, comprising: a purge fluid reservoir in fluid communication with the salt cavern, said reservoir configured for providing purge fluid into the salt cavern for purging contaminants contained within an interior region of the cavern; a hydrogen storage and processing facility in fluid communication with the salt cavern; a first flow network positioned between the salt cavern and the purge fluid reservoir; and a second flow network positioned between the salt cavern and the hydrogen storage and processing facility.

In a third aspect, an underground hydrogen storage cavern is provided that is formed by solution mining an underground salt formation to form an interior cavity defined, at least in part, by salt cavern walls, said salt cavern walls being stressed to induce infiltration of one or more contaminants across the salt cavern walls into an interior region of the salt cavern, wherein at least a portion of said one or more contaminants within the interior region is subsequently purged with a purge fluid to reduce a concentration of said one or more of the contaminants in the cavern.

In a fourth aspect, a method for removing one or more contaminants from a salt cavern is provided, comprising: introducing fresh or unsaturated brine into the cavern; dissolving a portion of said one or contaminants into the brine; removing hydrogen product from a hydrogen pipeline; compressing the hydrogen product to produce a compressed hydrogen product; introducing the compressed hydrogen product into the salt cavern; and displacing at least a portion of the brine comprising the portion of said one or more contaminants dissolved therein with the compressed hydrogen product to purge the portion of said one or contaminants from the cavern.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

As used herein, unless indicated otherwise, all concentrations are expressed as volumetric percentages. The disclosure is set out herein in various embodiments and with reference to various aspects and features of the invention. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

Figure 1:
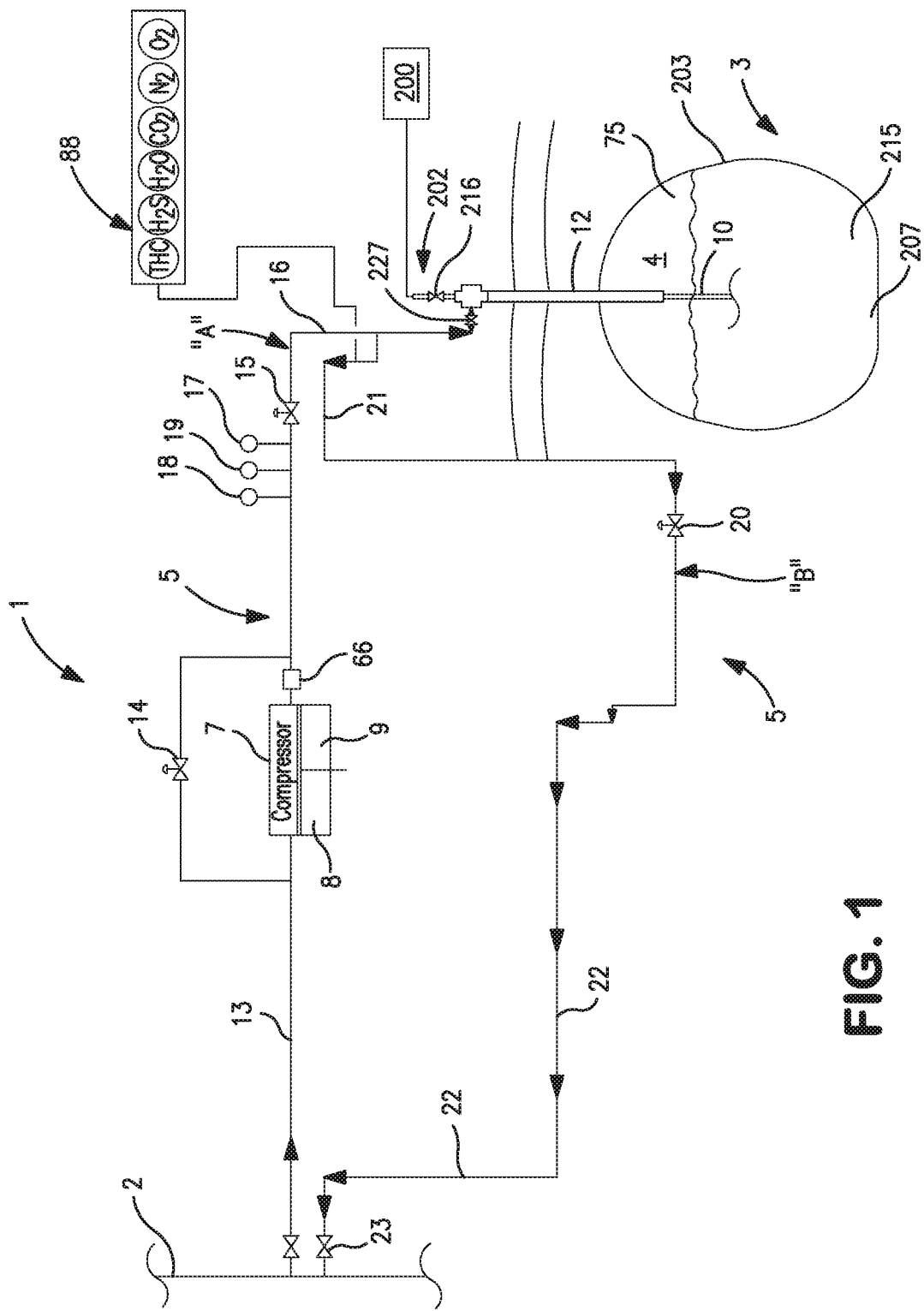
FIG. 1 shows a fragmentary schematic of a protocol for introducing and storing hydrogen to a hydrogen pipeline.

The salt cavern 3 is formed by solution mining in which fresh water is injected through a pipe known as a brine string 10, as shown in FIG. 1. The water dissolves the salt to form a brine solution 215 such that a void space is created. As used herein and throughout, the terms "void space", "interior region" and "cavity" are used interchangeably throughout the specification and are intended to have the same meaning. The resultant salt cavern 3 is defined, at least in part, by the void space that is bounded by the salt cavern walls 203. The salt cavern walls 203 consist of various rocks which tend to deposit into thick and dense layers over time. The deposited layers are gradually covered and buried by overburden sediments. The weight or pressure of the overburden sediments causes the salt formations to form densified and stratified structures, which tend to undergo viscoplastic slippage or deformation, either of which can create mircrocracks. The viscoplastic slippage or deformation causes the grain boundaries within the salt cavern walls 203 to move, thereby increasing the porosity of the salt cavern walls 203.

The cavern 3 forms part of a hydrogen storage and processing facility 1 as shown in FIG. 1. The hydrogen storage and processing facility 1 is designed to remove a hydrogen stream 13 from a hydrogen pipeline 2 during periods of low customer demand that can be stored within a salt cavern 3 as stored hydrogen 4. During periods at which demand for hydrogen product exceeds the capabilities of the hydrogen pipeline 2 to supply hydrogen product to the customers, stored hydrogen 4 can be removed from the salt cavern 3 as product stream 22, which can then be exported to the hydrogen pipeline 2 to assist in meeting demand.

Depending upon the structural configuration and properties of the salt cavern walls 203, localized portions of the salt cavern walls 203 may contain porosities large enough for contaminants entrapped within the salt walls 203 to pass therethrough and enter into the interior cavity of the salt cavern 3 where the stored hydrogen 4 is maintained. Various contaminants are contemplated, including, by way of example and not intending to be limiting to, water vapor, carbon dioxide, sulfur-containing compounds or hydrocarbon molecules (e.g., light hydrocarbons such as methane).

Contaminants may occupy the cavern in the liquid phase, gas phase or combination thereof. The result can be potential contamination of the stored hydrogen 4 whereby contaminants can exceed an upper limit of a hydrogen product purity specification. With respect to previous approaches, when the stored hydrogen 4 is withdrawn from the salt cavern 3, a crude stream 21 may form, which generally will require purification or dilution in order for the concentration of contaminants to be lowered to levels at or below a product purity specification to produce a hydrogen product stream 22 that can be exported to the pipeline 2.

Whereas previous approaches have focused on removal of contaminants from the crude hydrogen stream 21 that is withdrawn from the cavern 3, the present invention is directed to methods for purging contaminants from within the interior region of the cavern 3 along with the contaminants entrapped within the salt walls 203 of the cavern 3. The purging allows a concentration of one or more contaminants within the salt cavern 3 to be reduced during the operation of the cavern 3 such that use of surface purification equipment or pipeline mixing or dilution can be significantly reduced during the operational lifetime of the cavern 3 in comparison to a crude hydrogen stream 21 withdrawn from a cavern that is not subject to purging. In some instances, the purging can be performed several times until each of the contaminants contained in a hydrogen stream 21 withdrawn from the salt cavern 3 is at or below a product purity specification, thereby eliminating purification or dilution of the hydrogen stream 21. Specifically, a method for cycling of the cavern 3 will be disclosed with reference to FIGS. 2, 3 and 4 which describe a single cycling operation. The cycling causes contaminants to be purged from the cavern 3, preferably on a repeated basis. The term "purging" as used herein and throughout the specification means the removal of one or more contaminants from the cavern 3 with a selected purge fluid on a continuous or intermittent basis during construction, start-up, operation, maintenance and/or downtime of the cavern 3, so as to reduce a concentration of the one or more contaminants contained within the interior region of the cavern 3. The term "purge fluid" as used herein is intended to mean either a gas phase, liquid phase or a combination thereof which may entrain and/or dissolve the one or more contaminants in the cavern 3. "Cycling" of the cavern 3 as used herein refers to one or more purging operations of the cavern 3 which may be optionally preceded by stressing of the walls 203 of the cavern 3. The cavern 3 is cycled to reduce the overall level of contaminants in the cavern 3, including those contaminants entrapped within the walls 203.

Figure 2:
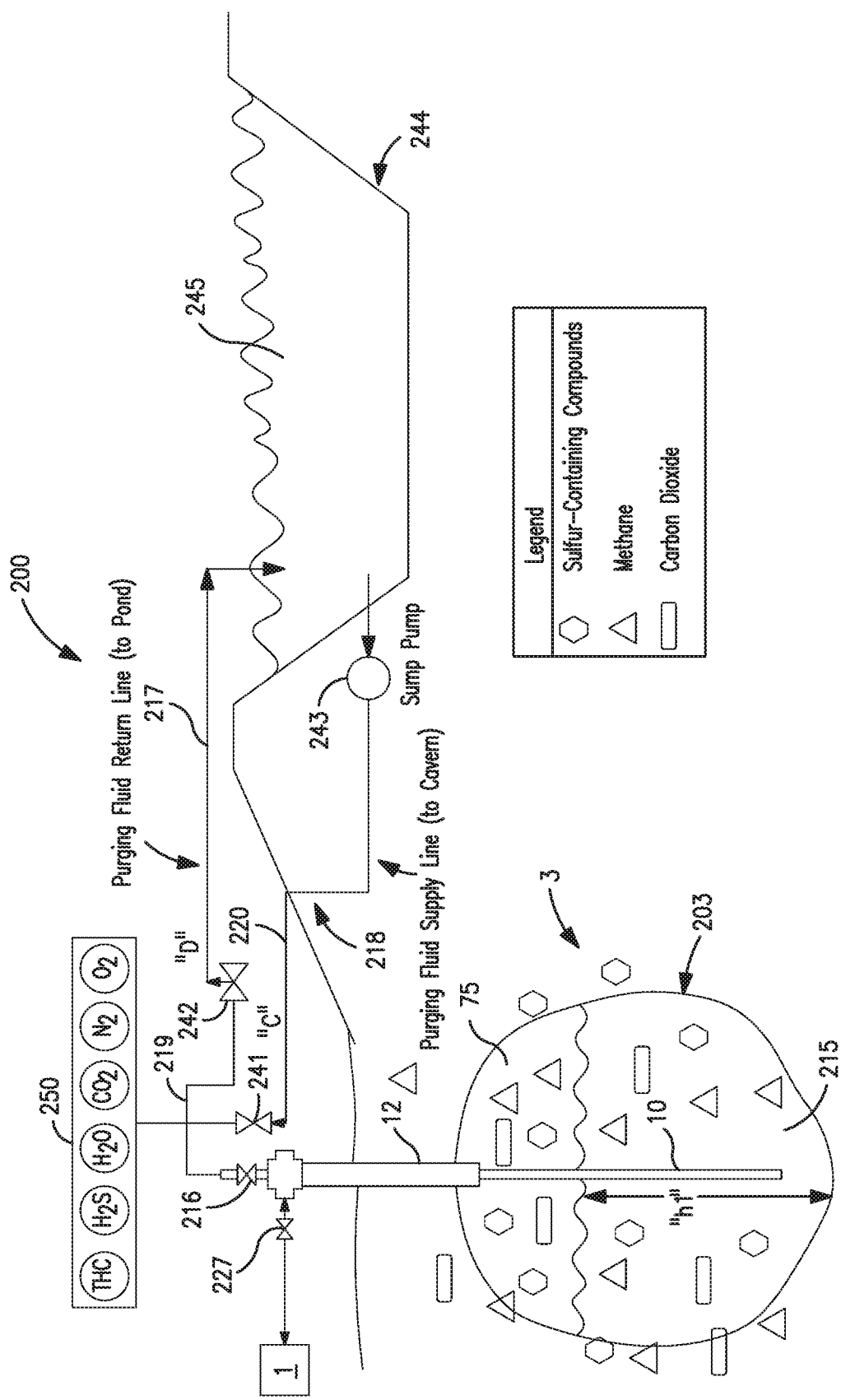
FIG. 2 shows a brine pond system connected to a salt cavern in which the brine pond system can supply fresh or unsaturated brine into the salt cavern as needed to introduce and remove contaminants from the salt cavern.

FIG. 2 shows the salt cavern 3 connected to a brine pond system 200. It should be understood that the cavern 3 can be connected to two or more brine pond systems. The salt cavern 3 preferably remains connected to the brine pond system 200 during operation of the cavern 3 to allow transport of brine 215 from the cavern 3 to the brine pond system 200, and the introduction of fresh or unsaturated brine 245 from the brine pond system 200 to the cavern 3. The brine pond system 200 includes a brine pond reservoir 244 that contains fresh or unsaturated brine 245, sump pump 243, analyzer bank 250 and flow network 218 consisting of a supply line or leg "C", a return line or leg "D", valve 241 and valve 242. The flow network 218 allows the brine 215 to be transported to the salt cavern 3 through supply leg "C" and subsequently returned to the brine pond reservoir 244 through return leg "D". It should be understood that the brine pond system 200 may contain any suitable processing for the removal of contaminants from the brine 215 to produce unsaturated brine that can be reintroduced into the cavern 3. Alternatively, fresh brine can be introduced from brine pond reservoir 244.

Referring to FIGS. 1 and 2, the brine 215 formed during solution mining is not withdrawn from the bottom portion 207 of the cavern 3. This approach, as will be discussed in greater detail below, is in contrast to conventional techniques where a substantial amount of brine 215 formed during solution mining is removed from the salt cavern 3 after the void space of the cavern 3 is formed because the accumulation of brine 215 in the cavern 3 reduces the working volume of the cavern 3 (i.e., the storage capacity in the cavern 3 for hydrogen product is reduced). The brine 215 is removed through the annular space (not shown) formed in the final well casing 12 or other conduit between the inner wall of the final well casing 12 and the outer wall of the brine string 10. Further, any residual brine 215 remaining in the salt cavern 3 is generally removed through the brine string 10 by pressure displacement resulting from the injection of hydrogen through the final casing 12 or other conduit. Once the level of brine 215 reaches the bottom of the brine string 10, a top section of the brine string 10 is sealed off by valve 216 and a residual brine layer, also known as a brine sump, may generally remain in the salt cavern 3 at the bottom portion 207 of the cavern 3.

In contrast to such conventional techniques, the present invention allows brine 215 from the solution mining process to accumulate to a predetermined level, designated as h1 (FIG. 2), in the cavern 3. The accumulation of the brine 215 enables contaminants entrapped within the cavern walls 203 to be released into the interior region of the cavern 3 and thereafter to contact the brine 215. At least a portion of the released contaminants can dissolve into the brine solution 215. The contaminants exhibit a preference to dissolve into the brine 215 as opposed to remain in the vapor space 75 of the cavern 3. In this manner, the present invention recognizes and takes advantage of the solubility properties of brine 215 to dissolve or "soak up" impurities from the salt cavern walls 203, such that a majority of the impurities can dissolve into the brine 215 instead of pollute the stored hydrogen 4.

In FIGS. 2-7, a legend with different shapes is utilized to represent the various types of contaminants. It should be understood that the legend is not an exhaustive list of all possible contaminants that may be encountered during storage of hydrogen 4 in the salt cavern 3. Additionally, the relative sizes of the various contaminants are not necessarily shown to scale.

Still referring to FIG. 2, additional fresh or unsaturated brine 245 is introduced from the brine pond reservoir 244 to increase the solubility capacity of the brine 215 contained within the cavern 3. FIG. 2 shows the salt cavern 3 connected to the brine pond system 200. Sump pump 243 is utilized to transport the fresh or unsaturated brine 245 from the bottom of the brine pond reservoir 244, which is generally at atmospheric pressure. It should be understood that any type of pump may be used to transport the brine 245, including a positive displacement pump or a centrifugal pump. The sump pump 243 pressurizes and transports the fresh or unsaturated brine fluid 245 along flow leg "C" as stream 220. Valve 227 is set in the closed position to isolate the cavern 3 from the hydrogen storage and processing facility 1 of FIG. 1. Valve 242 is closed, and transfer well head valve 216 and valve 241 are set in the open position to allow the brine 245 to flow as stream 220 through a conduit 219 connected to the transfer well head valve 216 and thereafter into an annular flow area of well casing 12

Figure 3:
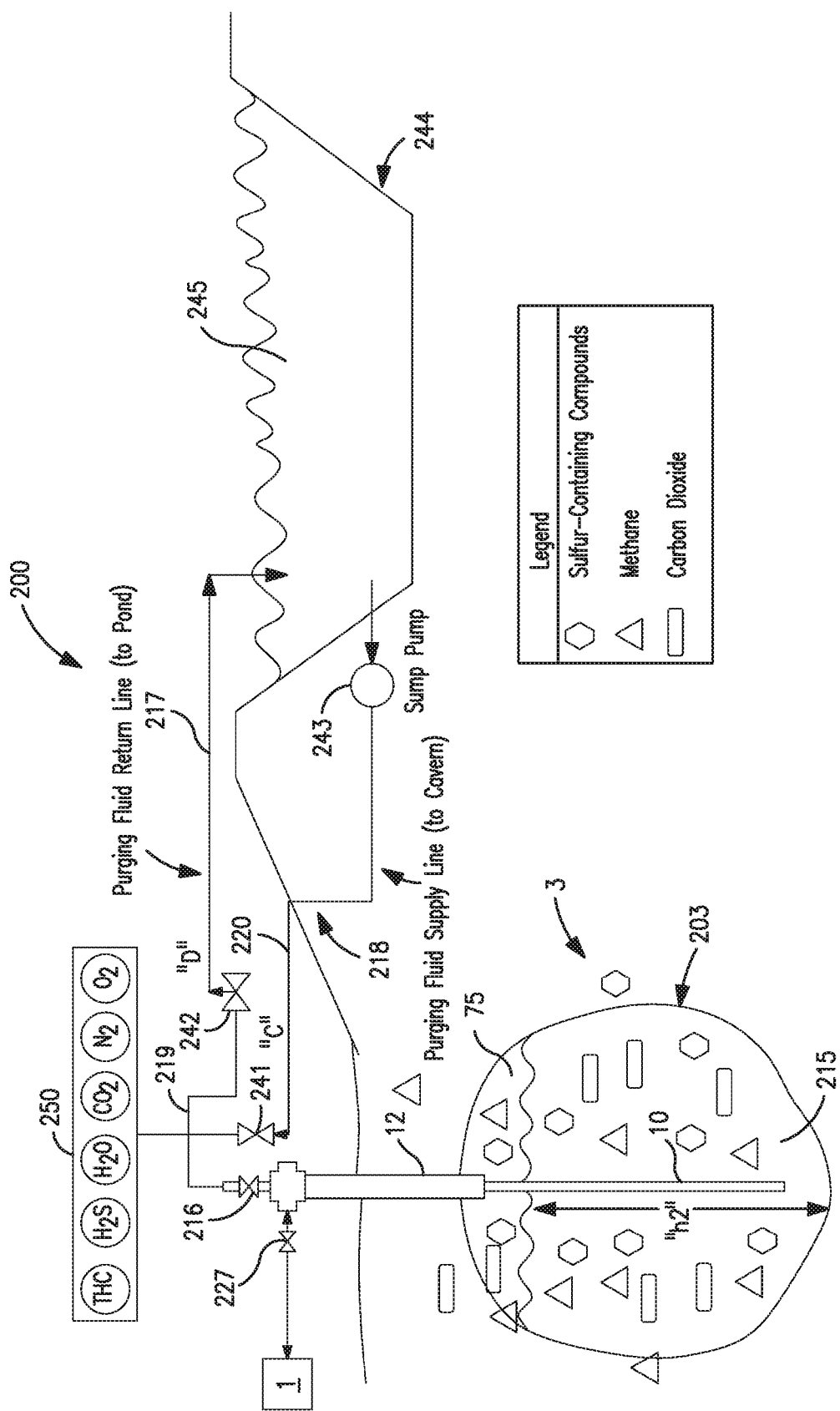
FIG. 3 shows the introduction of additional fresh or unsaturated brine from the brine pond system into the cavern.

(between the inside of final well casing 12 and outside of brine string 10). The fresh or unsaturated brine 245 enters the cavern 3. The level of brine 215 within the cavern 3 accumulates to a new level "h2", as shown in FIG. 3. Height, h2, of FIG. 3 is shown to be greater than the height, h1, of FIG. 2. The introduction of additional fresh or unsaturated brine 245 increases the solubility capacity of the brine 215, which allows for a greater amount of contaminants to dissolve into the brine 215 within the salt cavern 3. When introduction of fresh or unsaturated brine 245 is complete, a top section of the brine string 10 is sealed off by valve 216. The amount of unsaturated brine 245 introduced into the cavern 3 can be based upon several variables, including the existing level "h1" of brine 215 in the cavern 3 along with its degree of saturation; the concentration of contaminants in the headspace 75 of the cavern 3; and the amount of stored hydrogen 4 in the cavern 3. In one example, the stream 220 of fresh or unsaturated brine 245 is introduced into the cavern 3 in an amount that is sufficient to lower the concentration of one or more contaminants. In another example, the stream 220 of fresh or unsaturated brine 245 is introduced into the cavern 3 in an amount that is sufficient to decrease the concentration of one or more contaminants in the head space 75 to a level at or below a product purity specification. The brine 215 can occupy a range from about 1% to about 75% based on the total volume of the cavern 3. In another example, the brine 215 can occupy 25% or more of the cavern volume. In yet another example, the brine 215 can occupy 50% or more of the cavern volume.

After a sufficient amount of brine 245 is introduced from the reservoir 244, valves 216 and 241 are closed to isolate the cavern 3 from the brine pond reservoir 244. The brine 215 settles in the cavern 3 and is provided sufficient time for a substantial portion of the released gaseous contaminants occupying the interior region of the cavern 3 to dissolve into the brine solution 215 that has accumulated to a height "h2" (FIG. 3) within the interior region of the cavern 3.

The introduction of additional brine 245 to increase the solubility capacity of the brine solution 215 contained in the cavern 3 can occur upon detection of brine 215 that has approached or reached saturation in the cavern 3. In this regard, periodic samples of the brine 215 may be withdrawn from the cavern 3 by displacement of the brine 215 with a pusher gas and then measured by analyzer bank 250 to determine whether the brine 215 has approached or reached saturation. Alternatively, the fresh or unsaturated brine 245 can be introduced when increased levels of one or more gaseous contaminants are detected within the head space 75 of the cavern 3 by analyzer probes (not shown) placed within the head space 75 of the cavern 3. In another example, a more simplified approach can be utilized whereby a predetermined volume of fresh or unsaturated brine 245 can be introduced as desired or needed during operation of the cavern 3 without employing any detection methods.

FIG. 3 shows that a sufficient amount of brine 215 has been introduced and maintained within the cavern 3 to allow at least a portion of the contaminants in the cavern 3 to dissolve into the brine 215. In particular, the amount of contaminants in the headspace 75 of cavern 3 is less than that shown in FIG. 2, and a greater amount of contaminants is shown in the brine 215 in FIG. 3 as compared to FIG. 2.

The brine 215 is returned to the brine pond reservoir 244, preferably when approaching or reaching saturation, thereby purging contaminants from the cavern 3. In a preferred embodiment, the brine 215 is returned upon introduction of hydrogen product, preferably as compressed hydrogen stream 16, from the hydrogen pipeline 2 into the cavern 3. The introduction of the compressed hydrogen stream 16 act as a displacement fluid to displace brine 215 from the cavern 3 and subsequently into the brine pond reservoir 244. Specifically, referring to FIG. 1, a hydrogen stream 13 can be removed from the hydrogen pipeline 2 or alternatively received from another hydrogen production facility or storage source (not shown) and introduced into the salt cavern 3. "Hydrogen pipeline" or "hydrogen product pipeline" as used herein is intended to refer any conduit or passageway extending between the salt cavern 3 and the hydrogen production facility or storage source. In this regard, referring to FIG. 1, valve 24 is open to allow a portion of the product hydrogen in pipeline 2 to enter leg "A" of flow network 5 as hydrogen stream 13. As used herein and in the claims, the term "legs" means flow paths within the flow network 5 that are formed by suitable conduits. Such conduits would be positioned to conduct the flow of the hydrogen streams within the flow network 5 as illustrated in FIG. 1. Bypass valve 14 is set in a closed position, valve 15 is set in an open position, valve 20 is closed and valve 227 is open. Valve 241 is set in a closed position 241 (FIG. 3) along the supply flow leg "C" of the brine pond system 200.

Referring to FIG. 1, hydrogen stream 13 is compressed in a hydrogen compressor 7 to produce a compressed hydrogen stream 16. Hydrogen compressor 7 can be any known compressor as used in the art, and is typically a compressor having a reciprocating piston. In a preferred embodiment, the hydrogen compressor 7 incorporates a first stage 8 and a second stage 9 in series with interstage cooling between stages and an aftercooler 66, which is preferably employed to remove the heat of compression. The compressor 7 is conventionally controlled to maintain the inlet pressure at a target suction pressure to maintain the energy efficient operation of the compressor 7.

After hydrogen stream 13 is compressed to form compressed hydrogen stream 16, the compressed hydrogen stream 16 enters well-casing or conduit 12 (FIG. 1), which is connected to the transfer well head assembly 202, and thereafter into an annular flow area (not shown) within final well casing 12 (i.e., between the inside of final well casing 12 and the outside of brine string 10). As the compressed hydrogen stream 16 emerges from the bottom of the brine string 10, it enters the interior region of the salt cavern 3. Flow orifice meter 17, pressure transmitter 18 and temperature transmitter 19 can be used to determine the quantity of compressed hydrogen stream 16 that is introduced into the salt cavern 3.

Figure 4:
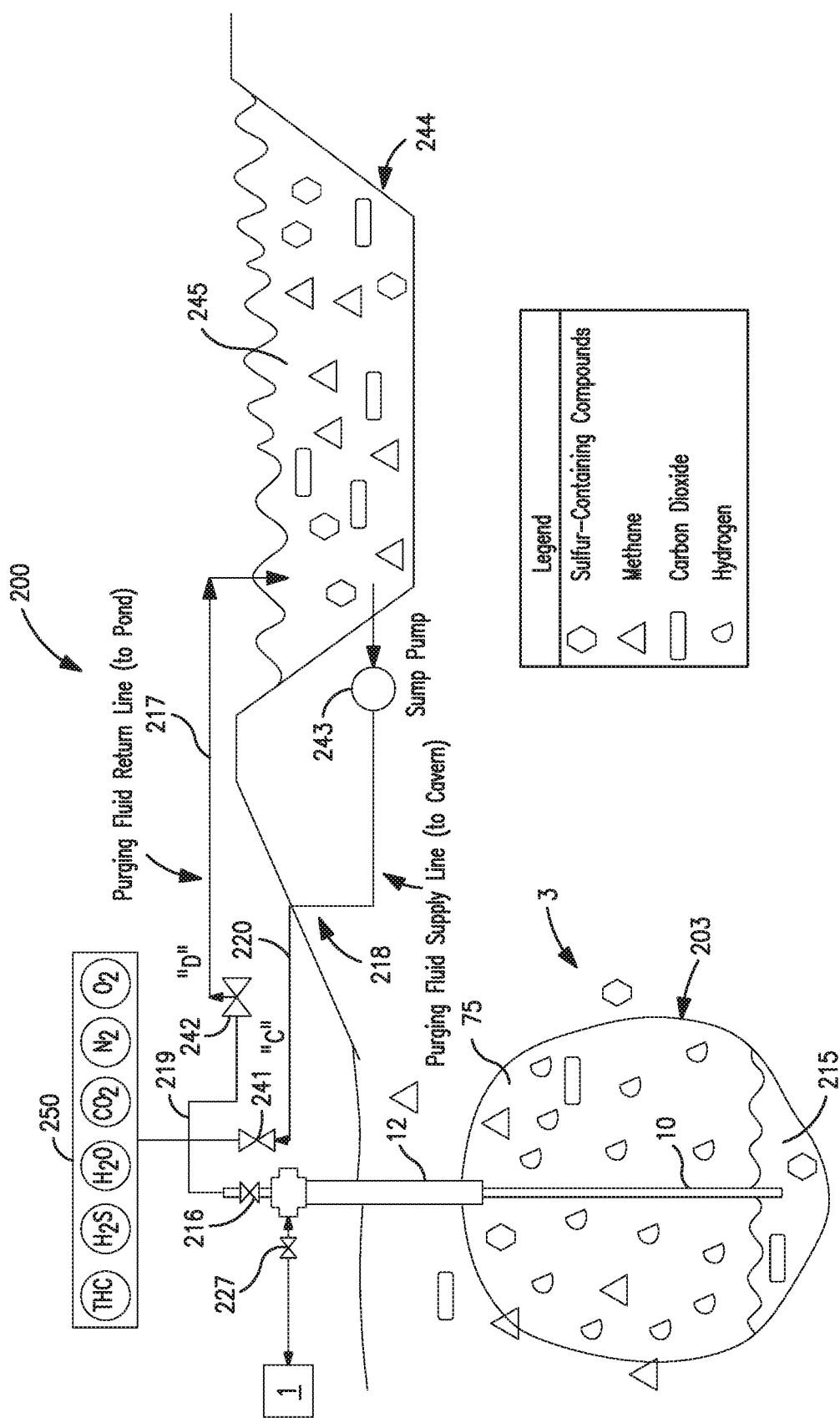
FIG. 4 shows the introduction of hydrogen product into the stored cavern with the simultaneous displacement of brine from the cavern and returned to the brine pond reservoir.

The amount of compression of hydrogen stream 13 will at least be partially dependent upon the amount of brine 215 and stored hydrogen 4 in the salt cavern 3. Referring to FIG. 4 as the compressed hydrogen stream 16 enters the interior region of the salt cavern 3 to form stored hydrogen 4, a substantial portion of the brine solution 215 stored therein is displaced by the compressed hydrogen stream 16 entering the cavern 3. The brine solution 215 travels upwards through the brine string 10 and well casing 12. Valve 242 along return line "D" of flow network 218 is open to allow the brine solution 215 to flow as stream 217 into the brine pond reservoir 244. Any undissolved contaminants may be entrained within the brine solution 215 as it is displaced by the compressed hydrogen stream 16 that enters the cavern 3. Other contaminants such as water vapor, carbon dioxide, methane, sulfur-containing compounds and light hydrocarbons remain dissolved in the displaced brine solution 215. FIG. 4 shows that the level of brine 215 remaining in the cavern 3 of FIG. 4 is reduced in comparison to FIG. 3, as the compressed hydrogen stream 16 entering the cavern 3 displaces a portion of the brine solution 215 from out of the cavern 3 to the reservoir 244. Purging of a portion of contaminants is achieved upon the displacement of brine 215 from the cavern 3. The return of the displaced brine 215 to the reservoir 244 causes a portion of contaminants in the cavern 3 to be transferred into the brine pond reservoir 245, as shown by the various contaminants in the brine pond reservoir 245 of FIG. 4.

FIG. 4 shows the salt cavern 3 after completion of a single purge cycle. Stored hydrogen 4 occupies the cavern 3 and a substantial portion of the brine solution 215 has returned to the brine pond reservoir 244. Residual purge fluid 215 remains at the bottom portion 207 of the cavern 3. The purge allows a reduction in the amount of contaminants in the cavern 3, which have now been transferred into the brine pond reservoir 244 by virtue of the hydrogen displacement. Specifically, the amount of contaminants in the cavern 3 in FIG. 4 is less than that of FIG. 3 and FIG. 2. As there is a finite amount of contaminants entrapped within the layers of the salt walls 203, the amount of contaminants released from the cavern walls 203 can be lowered by performing a single cycling of the cavern 3, as represented by the purge cycle of FIGS. 2, 3 and 4. It should be understood that purging can occur before introduction of hydrogen product into the cavern 3, by utilizing a suitable type of pusher fluid, such as, by way of example, nitrogen, air, carbon dioxide, water or any combination thereof. The pusher fluid is preferably removed with the brine 215 and contaminants therein to avoid contamination with hydrogen that is introduced into the cavern 3 for storage.

To further reduce contaminant infiltration, another cycling of the cavern 3 is preferably performed to purge additional contaminants from the cavern 3. Fresh or unsaturated brine 245 from the brine pond reservoir 244 is introduced in the manner described with regards to FIG. 2 and FIG. 3. The level of brine 215 increases in the cavern 3 to a level that is higher than shown in FIG. 4. The amount of fresh or unsaturated brine 245 that is introduced causes at least a portion of the contaminants to dissolve into the brine 215 in the presence of the stored hydrogen 4. In this manner, the amount of contamination imparted to the stored hydrogen 4 may be reduced by some of the contaminants dissolving into the brine 215. The brine 215 and contaminants therein can be displaced upon introduction of hydrogen product into the cavern 3 or a suitable pusher fluid, such as nitrogen, air, carbon dioxide, water or any combination thereof.

As can be seen, the present invention in one aspect is counterintuitive as the maintenance of brine 215 in the cavern 3 during operation creates a smaller usable or working volume for storage of hydrogen 4. However, the present invention allows for the ability to retain larger amounts of brine 215 in the cavern 3 (e.g., 25% or higher based on a total volume of the cavern 3), with or without the presence of stored hydrogen 4, and operate with a smaller working volume because hydrogen can be utilized as a displacement fluid or pusher gas to displace brine solution 215 from the cavern 3 to the brine pond reservoir 244. In this manner, contaminants are purged from the cavern 3 to the brine pond reservoir 244.

Additionally, such an approach is counterintuitive to the belief prior to the present invention that hydrogen cavern operation should minimize the contact, disruption or mixing of stored hydrogen 4 with brine 215, and in particular saturated brine, as any type of bulk or interfacial mixing of stored hydrogen 4 with brine 215 can contaminate the stored hydrogen 4. Any contaminants imparted to the stored hydrogen 4 by virtue of contaminants being transferred from the brine 215 to the stored hydrogen 4 by contact, mixing or disturbance of the brine 215 can produce a crude hydrogen stream 21 that may likely require purification or dilution to meet a product purity specification. In this regard, U.S. Pat. Nos. 8,425,149 and 8,757,926 and U.S. Patent Publication No. 2014/0241802 maintain a minimum quantity of stored hydrogen 4 within the salt cavern 3 to create a stagnant layer having carbon dioxide contained therein. Stored hydrogen stream 4 is withdrawn from the salt cavern 3 without disturbing a stagnant layer of stored hydrogen 4, thereby minimizing carbon dioxide contaminants from being drawn into the stored hydrogen 4 as a portion of it is withdrawn from the cavern 3.

The cycling of the cavern 3 as shown and described with reference to FIGS. 2, 3 and 4 with one or more purging operations in accordance with the principles of the present invention produces a so-called "cleaner" cavern containing less entrapped contaminants over its operational lifetime. The amount of contaminants contained in the brine 215 is expected to reduce over time, thereby reducing the amount of contaminants available to be potentially drawn into the stored hydrogen 4 from brine 215 over the operational lifetime of the cavern 3, even with contact, disruption or mixing of the stored hydrogen 4 with the brine 215. Further, the contaminants have a preference to remain in solution with the brine 215 as opposed to being drawn into the stored hydrogen 4. The use of hydrogen product itself as a displacement gas to periodically displace a substantial portion of brine 215, which can approach saturation with contaminants, can reduce the time of contact, disruption or mixing between saturated brine 215 and the stored hydrogen 4. As such, the present invention offers a simplified method for introducing and withdrawing stored hydrogen 4 in a cavern 3 without the need to minimize contact, disruption or mixing of stored hydrogen 4 with brine 215.

Referring to FIG. 1, during operation of the cavern 3, there will be instances when a hydrogen generation facility is taken off-line or when demand for hydrogen by customers otherwise exceeds the available production capabilities, either of which necessitates removal of at least a portion of the stored hydrogen 4 from the salt cavern 3. Valves 241 and 242 are closed to isolate the cavern 3 from the brine pond system 200. Well head valve 227 is set in an open position to allow the stored hydrogen 4 to be withdrawn from the cavern 3 as stream 21. Stream 21 is withdrawn from the cavern 3 and enters the hydrogen storage and processing facility 1, shown in FIG. 1. Referring to FIG. 1, valve 15 is closed and valve 20 is opened to allow a portion of the stored hydrogen 4 to be discharged from the cavern 3 as a hydrogen stream 21. Because the pressure of the stored hydrogen 4 is higher than that of the pipeline 2 in this particular example, the hydrogen stream 21 readily flows through the second leg "B" of flow network 5. When the appropriate amount of stored hydrogen 4 has been removed, valve 20 is closed to isolate the cavern 3. An analyzer bank 88 may be used to measure the contaminants in stream 21. Preferably, and particularly during start-up of the cavern 3, the purity level of stream 21 is monitored by the analyzer bank 88 to assist in determination of whether to introduce additional brine 245 from brine pond reservoir 244. The analyzer bank 88 measures the hydrogen purity level and concentration of impurities (e.g., $CH_4$, $CO_2$, $H_2O$, $H_2S$, CO, $N_2$ and $O_2$) within the crude hydrogen stream 21. Analyzer 88 may comprise any suitable type of sensing element as known in the art. For instance, electrochemical sensor elements may be employed. The sampling of the hydrogen stream 21 is intended to be a representative measurement of the composition of the hydrogen and any contaminants contained in the stored hydrogen 4. A sample line is provided to feed a sample of the hydrogen stream 21 to each sensing element (e.g., $H_2$, THC, $H_2S$, $H_2O$, CO2/CO, $N_2$ and $O_2$) that is contained in the analyzer bank 88. Each of these impurities diffuses into the sensing element and each of the sensors undergoes an electrochemical reaction in which current is generated. The amount of electrical current generated is proportional to the amount of contaminants present in each of the sensors.

Alternatively, an analyzer probe (not shown) or other suitable instrumentation as known in the art may be directly inserted into the well casing 12 for measurement of the hydrogen purity level and/or any other contaminants of the stored hydrogen 4 within the salt cavern 3. The measurement of any contaminant levels which exceed a product purity specification may require purification or dilution of the crude hydrogen stream. However, the present invention can reduce the amount of contaminants required to be removed from a crude hydrogen stream 21 as the cavern 3 becomes depleted of entrapped contaminants by virtue of cycling of the cavern 3 one or more times on a continuous or intermittent basis. In this regard, as operation of the cavern 3 continues, the hydrogen stream 21 may be returned directly to the hydrogen pipeline 2 without purification or dilution when analyzer bank 88 indicates each of the contaminant levels is at or below a product purity specification.

After the necessary amount of stored hydrogen 4 is withdrawn from the cavern 3, additional fresh or unsaturated brine 245 may be introduced into the cavern 3 to again increase the solubility capacity of the brine 215. The accumulation of brine 215 in the cavern 3 can continue for a sufficient time to facilitate dissolution of any contaminants remaining within the interior region of the cavern 3 as well as entrapped in the salt walls 203. The brine 215 can be displaced at a later time when hydrogen product is withdrawn from the pipeline 2, compressed and then injected as compressed hydrogen stream 16 into the cavern 3 for storage. Alternatively, the brine 215 may be displaced by another suitable pusher or displacement fluid prior to introducing hydrogen product.

The introduction of brine 215 into the cavern followed by displacement of brine 215 by a compressed hydrogen stream 16 or another suitable pusher or displacement fluid on a repeated basis continues to purge the cavern 3 over its operational lifetime and create a cavern 3 less susceptible to contaminating stored hydrogen 4. In this manner, the cycling of the cavern 3 on a continuous or intermittent basis offers the benefit of reduced purification or dilution of the crude hydrogen stream 21 over time. The reduction of contaminants in the cavern 3 allows for greater operational flexibility of the cavern 3. For example, the cavern 3 can be entirely depleted of hydrogen without substantial release of contaminants.

In another embodiment, as a means to ensure sufficient solubility of one or more contaminants in the brine 215, the concentration of brine 215 can be maintained within a range of about 0.7 m to 5 m, where m is the molality and defined as moles of salt per 1000 grams of water. Additionally, the operating temperature and pressure of the cavern 3 may be monitored and adjusted as necessary to ensure solubility of one or more contaminants within the brine solution 215. The exact temperature and pressure conditions will vary depending, at least in part, on the type and amount of contaminants present in the cavern 3 at any particular time. For example, the temperatures for dissolving methane into brine 215 may range from about 35 F to greater than 400 F at a pressure ranging from about 159 psi to 1000 psi or higher. The temperatures for dissolving carbon dioxide into brine 215 may range from about 35 F to 600 F or higher at a pressure ranging from about 159 psi to 1000 psi or higher. Specific temperature and pressure regimes which overlap for all of the contaminants in the cavern 3 is one way to establish the operating temperature and pressure conditions in the cavern 3. Alternatively, the operating temperature and pressure can be set in accordance with the one or more particular contaminants which are above a product purity specification. For example, at a given time during operation of the cavern 3, if the cavern 3 contains carbon dioxide, sulfur-containing compounds and water vapor at or below a product purity specification, and methane is detected to be at a level higher than that allowed by the product purity specification, then the temperature and pressure can be set at a range within which solubility of the methane into the brine 215 is optimized.

Several methods can be used for establishing and regulating the operating ranges for temperature. For example, the temperature of the cavern 3 can be regulated, to a certain degree, by controlling the amount of heat of compression which is removed by the aftercoolers 66 when the hydrogen stream 13 is compressed, and the amount of brine 215 in the cavern 3. It should be understood that the temperature of the cavern 3 can also be impacted by other variables, including by way of example, the temperature and amount of the fresh or unsaturated brine 245 which is introduced from the brine pond reservoir 244 at a particular time during a purging operation; the heat of mixing of brine 245 from the reservoir 244 with brine 215 in the cavern 3; the heat of mixing of compressed hydrogen stream 16 with stored hydrogen 4; the negative Joule Thompson coefficient (i.e., temperature increase upon hydrogen expansion into the cavern 3); and the geothermal gradient (i.e., increasing temperature with increasing cavern depth) of the cavern 3. The ability to control some or all of the variables which impact temperature of the cavern 3 can allow the temperature to be within a prescribed range for optimizing solubility of one or more contaminants into the brine 215.

Several methods can be used for establishing and regulating the operating ranges for pressure. For example, the pressure in the cavern 3 can be established and regulated, to a certain degree, by controlling the amount of compression of hydrogen stream 13 by compressor 7; the amount of brine 215 occupying the bottom portion 207 of the cavern 3; and the amount of stored hydrogen 4 in the head space 75 of the cavern 3. The ability to control some or all of the variables which impact pressure of the cavern 3 can allow the operating pressure to be within the prescribed range for optimizing solubility of one or more contaminants into the brine 215.

In another aspect of the present invention, the cycling of the cavern 3 involves stressing of the cavern walls 203 prior to purging the contaminants. Stressing can occur mechanically, thermally, or by a combination of mechanical and thermal stressing.

Applicants have discovered that mechanical and/or thermal stressing of the cavern 3 may, at least in part, promote or create cavern instability of the cavern walls 203. This is contrary to conventional practice in which caverns are preferably maintained at substantially steady state temperature and pressure conditions to avoid disruption of the salt walls 203.

The instability can induce release of one or more contaminants entrapped within the layers of the cavern walls 203 into the interior region of the cavern 3. Stressing as described herein is characterized as a pressure shock caused by a change in pressure imparted to the walls 203 and/or a thermal shock caused by a change in temperature imparted to the walls 203. The change in pressure and/or change in temperature can cause contaminants to be released from the walls 203 and migrate into the interior region of the cavern 3. The intensity of the pressure shock is believed to be determined, at least in part, by the amount of increase or decrease of the pressure in combination with the rate of pressure change to the walls 203. Similarly, the intensity of the temperature shock is believed to be determined, at least in part, by the amount of increase or decrease of temperature in combination with the rate of temperature change to the walls 203.

The salt cavern walls 203 are composed of a series of stratified layers with porosity, as more fully described U.S. Ser. No. 14/475,120, and which is fully incorporated by reference herein in its entirety. It has been discovered that movement of one or more layers of the cavern walls 203 relative to each other in response to the mechanical and/or thermal stressing can occur in a manner which induces contaminant release across these layers of the salt walls 203 into the cavern 3. For example, the movement of one or more layers relative to one other by a mechanism such as viscoplastic slippage can induce contaminant release and migration across layers of the salt walls 203 into the cavern 3. The movement of the layers may also cause the entrapped contaminant molecules to be released or dislodged and then migrate into the interior cavity of the cavern 3, as a result of enlarged pores created by stress-induced fractures and/or cracks in the salt walls 203.

In one example, mechanical stressing can be created by a pressure increase. The amount of such pressure increase in combination with the rate at which the pressure increases can influence the intensity of the resultant mechanical stress or shock imparted to the walls 203. It should be understood that the mechanical stress can also be created by a lowering of pressure in the cavern 3 at a predetermined rate. The stressing of the walls 203 of the cavern 3 by increasing or lowering pressure is a non-static approach that is contrary to conventional techniques for operating the cavern 3 at a substantially static and non-varying pressure.

In one embodiment and as will be explained, the mechanical stressing and subsequent purging may be repeated one or more times prior to operation of the salt cavern 3. Because there is a finite amount of contaminants entrapped within the layers of the salt walls 203, the level of contaminant infiltration from the cavern walls 203 can be reduced.

Figure 5:
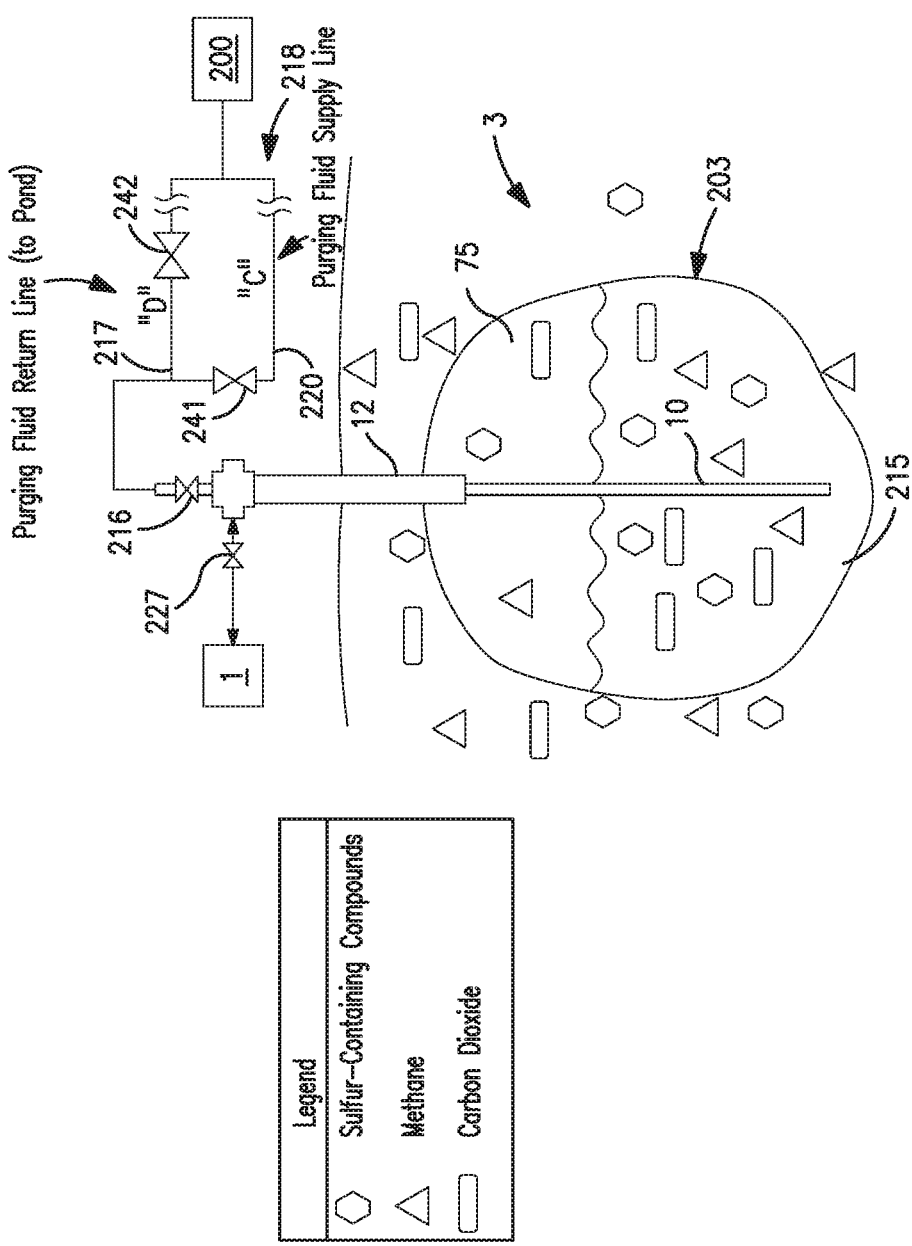
FIGS. 5, 6 and 7 show an exemplary sequence of steps for cycling a cavern while stressing the cavern walls prior to operation of the salt cavern.
Figure 6:
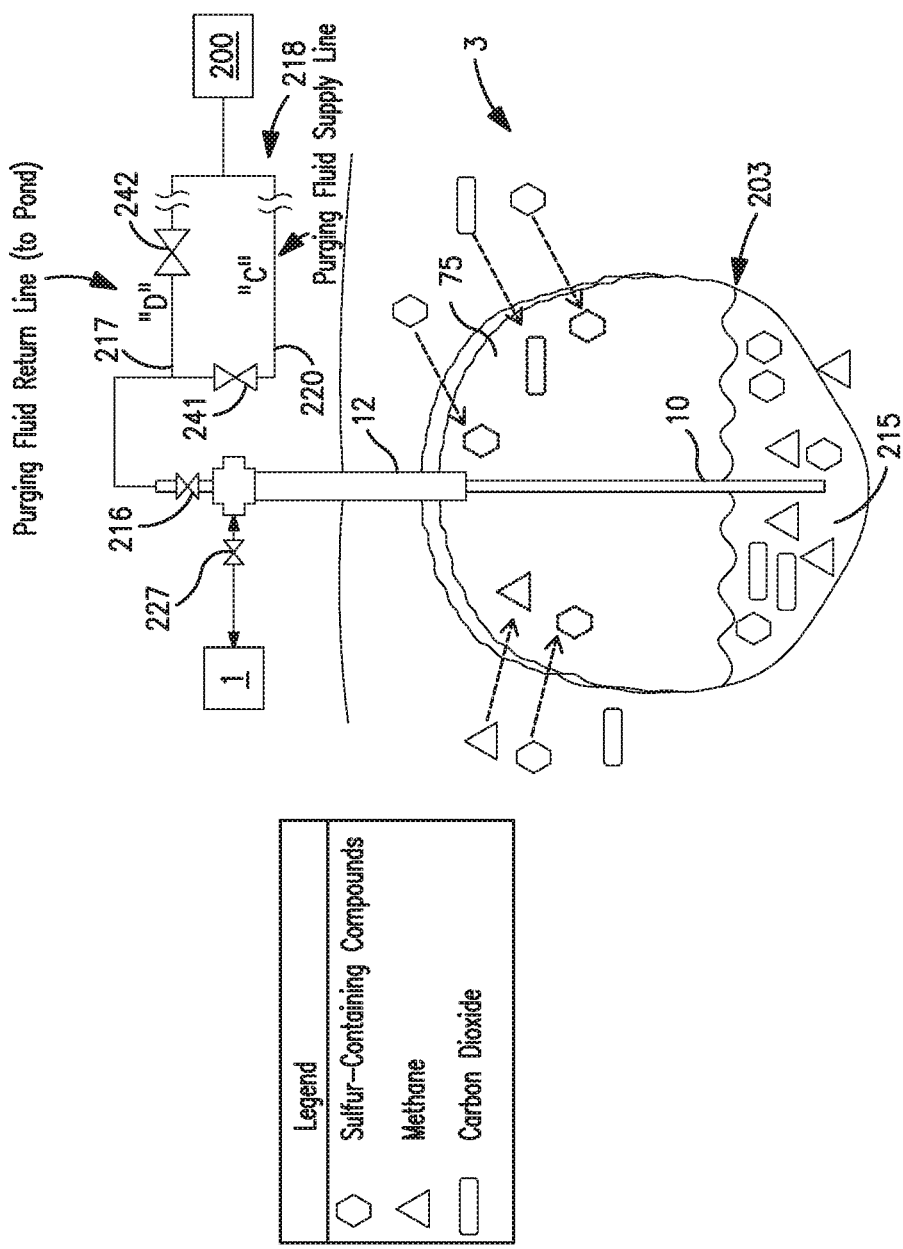
Figure 7:
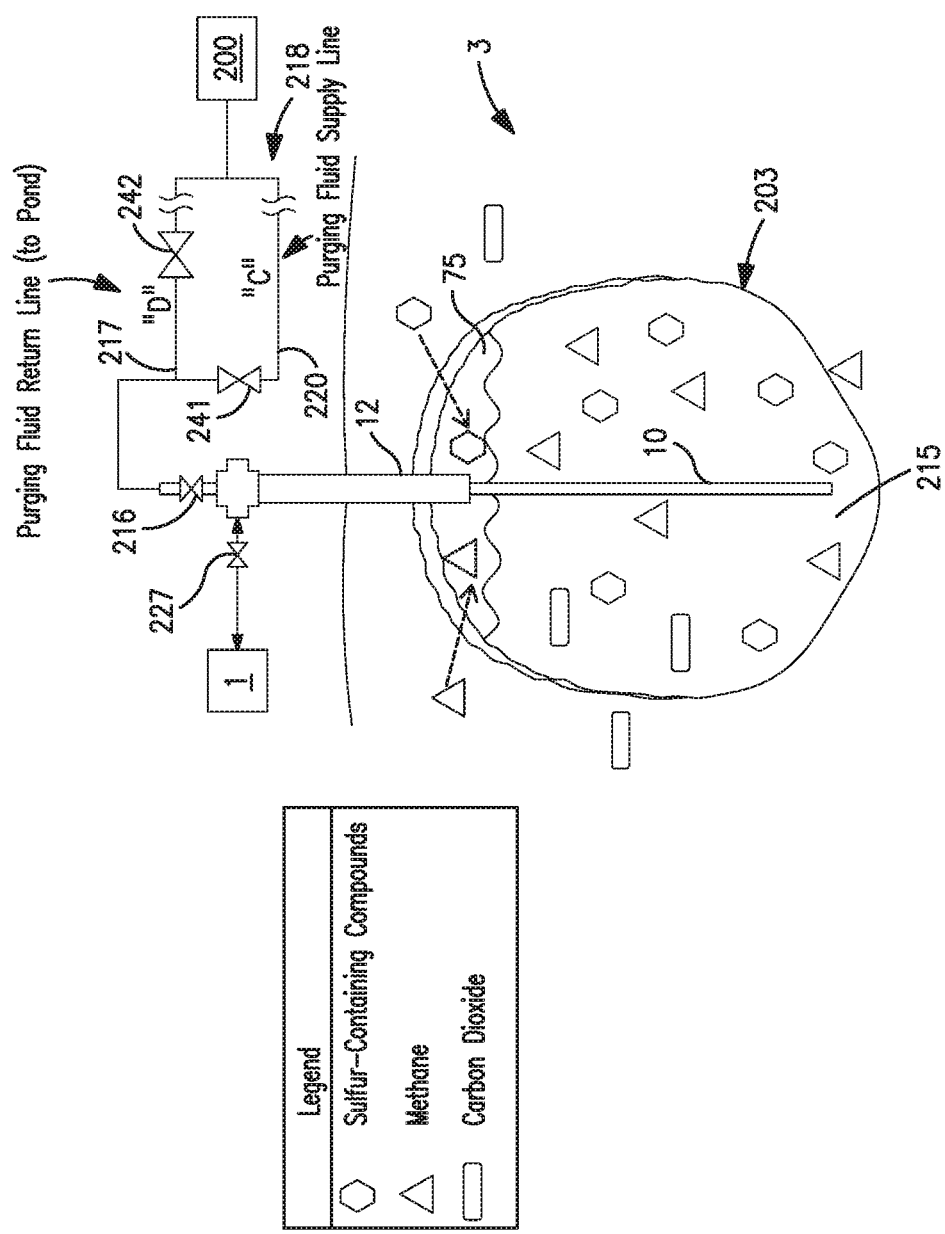

An exemplary cycling procedure prior to operation of the cavern 3 will now be described with reference to FIGS. 5, 6 and 7. With reference to FIGS. 5, 6 and 7, for purposes of clarity and to better illustrate the stressing phenomenon, details of the brine pond system 200 and the hydrogen storage and processing facility 1 have been omitted. However, it should be understood that the cavern 3 remains connected to both the brine pond system 200 and the hydrogen storage and processing facility 1. FIG. 5 shows the cavern 3 after solution mining. Brine 215 created from the solution mining of the cavern 3 is allowed to accumulate and settle in the cavern 3 for a sufficient time to dissolve at least some of the contaminants generated and released during solution mining. In this example, the brine 215 is shown in a saturated state as indicated by the various contaminants dissolved within the brine 215. Additionally, FIG. 5 shows the cavern 3 in a substantially unstressed or static state with a finite number of several types of contaminants entrapped within the walls 203 of the salt cavern 3. The unstressed state of the walls 203 is denoted by relatively smooth and single lines. By way of example, carbon dioxide, methane and sulfur-containing impurities are shown entrapped within the walls 203 of the salt cavern 3.

To induce the release of entrapped contaminants, the cavern 3 of FIG. 5 is mechanically stressed to create the stressed cavern 3 of FIG. 6. A pressurized fluid such as an inert gas is introduced into the cavern 3 of FIG. 5 to remove brine 215. The inert gas can enter the cavern 3 through an annular flow area of well casing 12 (between the inside of final well casing 12 and brine string 10). As the inert gas emerges into the cavern 3, the brine 215 is pushed upwards through the well casing 12. Valve 242 is opened and valve 241 is closed to allow brine 215 with the inert gas to flow as stream 217 through the return leg "D" of flow network 218 of the brine pond system 200 into the brine pond reservoir 244. A pump (not shown) along return line "D" may be provided to pressurize stream 217, if necessary, to ensure the return of the brine 215 to the brine pond reservoir 244. A downhole pressure transducer (not shown) may be employed in the headspace 75 to detect the decrease in pressure in the headspace 75 as a result of less brine 215 available in the cavern 3 to compress the headspace 75. In one example, the pressure in the headspace 75 may decrease to about 400 psi or lower, preferably 300 psi or lower and more preferably 200 psi or lower. The removal of brine 215 from the cavern 3 is returned to the brine pond reservoir 244 so as to decrease the pressure in the headspace 75 of the cavern 3 at a rate of about 1 to 2 psi/hr, preferably about 2 to 4 psi/hr and more preferably about 20 to 100 psi/hr or greater.

Referring to FIG. 6, the removal of at least a portion of brine 215 from the salt cavern 3 of FIG. 5 increases the volume of the headspace 75 and lowers the volume of the brine 215 occupying the cavern 3. The increase in volume of the headspace 75 decreases the pressure in the headspace 75 of the cavern 3. This pressure decrease at a predetermined rate stresses or destabilizes at least a portion of the cavern walls 203. The portion of the walls 203 susceptible to the stressing extends above the brine 215. In other words, the portion of the walls 203 extending along the headspace 75 of the cavern 3 is subject to stressing as a result of the decrease in pressure incurred within the headspace 75. The stressed walls 203 of FIG. 6 are designated by relatively less smooth lines in comparison to FIG. 5 and the relative movement of the layers of the stressed walls 203 is designated by double lines having irregular thickness. The portion of the walls 203 in contact with the brine 215 remains substantially unstressed and remains designated as a smooth, continuous and single line as depicted in FIG. 5. It should be understood that such designations for the stressed and unstressed walls 203 are intended to only illustrate the principles of the present invention, and are not intended to be an accurate representation of the structural configuration of the walls 203.

FIG. 6 shows a lower level of brine 215 as a result of some of the brine 215 in FIG. 5 being removed by an inert fluid. The destabilization creates movement of the individual layers of the stressed walls 203 (denoted as double lines with irregular thickness having less smooth lines) so as to dislodge or induce the release of entrapped contaminants into the interior region of the cavern 3. Such release of contaminants from the stressed walls 203 into the headspace 75 of the cavern is on-going as indicated by the dotted arrows in FIG. 6. For example, FIG. 6 shows a molecule of methane that is migrating across the layers of the stressed walls 203 into the interior region of the headspace 75 of the cavern 3. The dotted triangular shape on the arrowhead side designates the final location of the released methane molecule after migration is completed from stressing the walls 203, and the solid triangular shape on the non-arrowhead side designates the starting location before migration and prior to stressing of the walls 203. Three sulfur-containing compound molecules are also shown being released into the headspace 75. As a result of the release of contaminants in response to mechanical stressing of the portion of the walls 203, FIG. 6 shows notably less contaminants entrapped in the walls 203 in comparison to FIG. 5 where the cavern 3 is characterized and shown in a relatively stable, static and unstressed state. Contaminants are released into the headspace 75 of the cavern 3 of FIG. 6, some of which may then then enter into the brine 215. The release of contaminants into the brine 215 continues in this manner and causes the brine 215 to reach saturation. FIG. 6 indicates a saturated state of brine 215.

When the brine 215 reaches saturation, contaminants can no longer dissolve therein. Accordingly, additional fresh or unsaturated brine 245 is introduced from the brine pond reservoir 244 to further stress the cavern 3, promote release of entrapped contaminants into the interior region of the cavern 3, including the headspace 75, and dissolve at least some of the released contaminants into the brine 215. Generally speaking, the fresh or unsaturated brine 245 can be introduced upon detection of a saturated brine solution 215 in the cavern 3; an increase in impurity levels within the interior region of the cavern 3; and/or as a means to pressurize the headspace 75 of the cavern 3 to repeat the mechanical stressing of the walls 203 of the cavern 3. Referring to FIG. 2, valve 242 and valve 227 are set in the closed position and valve 241 and well head valve 216 are set in the open position. By utilizing sump pump 243, fresh or unsaturated brine 245 is pumped and exits from the bottom of the brine pond reservoir 244. The fresh or unsaturated brine 245 is transported along flow leg "C" as stream 220, which flows through conduit 219 connected to the transfer well head valve 216 and thereafter within final well casing 12 and brine string 10.

FIG. 7 shows cavern 3 with newly introduced fresh or unsaturated brine 245 occupying the cavern 3 at a level greater than that of FIG. 6. The introduction of fresh or unsaturated brine 245 into the cavern 3 causes the brine 215 to have higher saturation capacity which allows more contaminants to dissolve in the brine 215 in comparison to FIGS. 5 and 6. In this regard, FIG. 7 shows more contaminants in the brine 215 in comparison to FIGS. 5 and 6. It should be understood that any amount of fresh or unsaturated brine 245 can be introduced, depending at least in part on the concentrations of the one or more contaminants contained in the cavern 3 at a particular instance. As more fresh or unsaturated brine 245 is introduced into the cavern 3, more contaminants may dissolve into the brine 215. After a sufficient amount of brine 215 is introduced from the reservoir 244, valves 216 and 241 are closed to isolate the cavern 3 from the brine pond reservoir 244. A portion of the released gaseous contaminants occupying the interior region of the cavern 3 can continue to dissolve into the brine 215 that has accumulated within the interior region of the cavern 3. Sufficient time is allowed for dissolution of the released gaseous contaminants. In addition to dissolution of gaseous contaminants, it should be understood that residual or entrapped fluid within the walls 203 may also be released into the brine solution 215 and thereafter remain entrained when brine 215 is returned to the brine pond reservoir 244.

The accumulation of brine 215 in the cavern 3 reduces the usable volume of the cavern 3. The reduction in volume of the cavern 3 increases the pressure of the headspace 75. The increase in pressure in headspace 75 at a predetermined rate destabilizes at least a portion of the cavern walls 203 extending above the brine and into the headspace 75. In one example, the pressure may rise to about 200 psi or greater, preferably 300 psi or greater and more preferably 400 psi or greater. The pressure in the headspace 75 in the cavern can increase at a rate of about 1 to 5 psi/hr, preferably about 5 to 20 psi/hr and more preferably about 20 to 100 psi/hr or greater.

This destabilized portion of the walls 203 shown in FIG. 7 is subject to stressing. The stressed walls 203 in FIG. 7 are designated by relatively less smooth lines in comparison to FIG. 5, and the relative movement of the layers of the stressed walls 203 is designated by double lines having irregular thickness. The portion of the walls 203 in contact with the brine 215 remains substantially unstressed and are designated as a smooth, continuous single line. The non-smooth, irregular double lines are indicated only for purposes of denoting the stressed walls 203 as a result of the increased pressure at a predetermined rate, and are not intended to be an accurate representation of the structural configuration of the stressed walls 203. Similarly, the smooth, single lines are indicated to only illustrate the principles of the present invention and are not intended to be an accurate representation of the structural configuration of those portions of the walls 203 not subject to stressing.

The stressing of the walls 203 above the brine 215 causes the release of entrapped contaminants from the walls 203. In this regard, FIG. 7 shows a molecule of methane migrating into the cavern 3 as indicated by the dotted arrow. FIG. 7 also shows a molecule of a sulfur-containing compound migrating into the cavern 3, as indicated by another dotted arrow. FIG. 7 shows less entrapped contaminants than that of FIG. 5 or FIG. 6. FIG. 7 also shows less contaminants within the interior region of the cavern 3 than that of FIG. 5 or FIG. 6.

As dissolution of the gaseous contaminants into the brine 215 is completed, and the new pressure in the headspace 75 of the cavern 3 is achieved, the walls 203 of the cavern 3 approach or acquire a static equilibrium characterized by a substantially unstressed condition. It is at this stage that substantially no further contaminant release has a tendency to occur. Alternatively, or in addition thereto, the brine solution 215 may approach or reach saturation capacity when dissolution of the released contaminants is completed. Such conditions necessitate removal of at least a portion of the brine fluid 215 from the cavern 3 back to the brine pond reservoir 244 in the manner as has been described. A pressurized fluid such as an inert gas is introduced into the cavern 3 to remove brine 215. The inert gas can enter the cavern 3 through an annular flow area of well casing 12 (between the inside of final well casing 12 and brine string 10). As the inert gas emerges into the cavern 3, the brine 215 is pushed upwards through the well casing 12. Valve 242 is opened and valve 241 is closed to allow brine 215 with the inert gas to flow as stream 217 through the return leg "D" of flow network 218 of the brine pond system 200 into the brine pond reservoir 244. A pump (not shown) along return line "D" may be provided to pressurize stream 217, if necessary, to ensure the return of the brine 215 to the brine pond reservoir 244. The contaminants remain in solution as the brine 215 flows along return leg "D". Further, any residual or entrapped fluid that is immiscible or miscible within the brine solution 215 can be transported with the brine 215 as the brine 215 is returned to the reservoir 244.

In the manner described with respect to FIGS. 5, 6 and 7, additional stress-purge cycles can occur to further reduce the contaminant levels in the cavern 3 prior to start-up of the cavern 3. Further, it should be understood that the stressing can occur during operation of the cavern 3 to potentially accelerate removal of contaminants.

In another embodiment, thermal stress may be the preferred means of stressing the cavern 3 to induce release of entrapped contaminants. The brine 215 is only removed from the cavern 3 when saturated, and thereafter fresh or unsaturated brine 245 is introduced. In other words, the brine 215 is not used to mechanically stress the cavern, but only to allow contaminants to dissolve therein. Such a mode of operation may be conducive for certain salt formations which can be subject to thermal stressing. For such salt formations, the introduction of compressed hydrogen stream 16 into the cavern 3 by virtue of its negative joule Thompson coefficient (rise in temperature of hydrogen upon its expansion in volume) can contribute to the creation of a thermal stress to the salt cavern walls 203. The thermal stress is magnified by the geothermal gradient (i.e., higher temperature with increasing cavern depth). As a result, the present invention may be carried out whereby fresh or unsaturated 245 brine is regularly introduced and remains in the cavern 3 after introduction of compressed hydrogen stream 16 into the cavern 3. The thermal stress may induce release of entrapped contaminants, some of which can then dissolve into the brine 215.

It should be understood that the present invention may be carried out with other purge fluids. For example, any suitable inert gas, such as, by way of example, nitrogen, may be used to entrain gaseous contaminants in the cavern. The inert gas is introduced into the cavern 3 at a sufficient pressure to sweep out the gaseous contaminants from the headspace 75 of the cavern 3 and thereafter exit the cavern through the brine string 10 and well casing 12. The inert gas does not remain in the cavern 3 in the manner as has been described when employing brine as the purge fluid. To avoid contamination of the stored hydrogen 4 with the inert gas, the one or more purging operations are performed when stored hydrogen 4 does not occupy the cavern 3. It should be also understood that water may be used as an alternative to brine as a purge liquid.

As there is believed to be a finite amount of contaminants entrapped within the layers of the salt walls 203, cycling the cavern 3 prior to operation of the salt cavern 3 and/or during operation of the cavern 3 can reduce the level of contaminant infiltration from the cavern walls 203. As a result, the level of contaminants contained in the hydrogen stream 21 that is withdrawn from the salt cavern 3 can be reduced. In this manner, the need to subsequently purify or dilute the hydrogen stream 21 withdrawn from the cavern 3 during operation may be reduced or, in some instances, entirely eliminated. For example, the hydrogen stream 21 withdrawn from the cavern 3 comprises $CO_2$ that is reduced to a concentration of not more than about 5 ppm, preferably not more than about 3 ppm and more preferably not more than about 1 ppm. In another example, the hydrogen stream 21 withdrawn from the cavern 3 comprises $H_2O$ that is reduced to a concentration of not more than about 3000 ppm, preferably not more than about 1000 ppm and more preferably not more than about 100 ppm. In another example, the hydrogen stream 21 withdrawn from the salt cavern 3 comprises sulfur-containing compounds that are reduced to a concentration of not more than about 2000 ppm, preferably not more than about 1000 ppm and more preferably not more than about 100 ppm. In yet another example, the hydrogen stream 21 withdrawn from the salt cavern 3 comprises total hydrocarbons (THCs) that is reduced to a level of not more than about 5%, preferably not more than about 3% and more preferably not more than about 1%.

It should be understood that prior to operating the cavern 3, cycling of the cavern 3 can occur until at least one or more of the contaminants is at or below a product purity specification. In another embodiment, cycling of the cavern 3 occurs to until each of the contaminants in hydrogen stream 21 withdrawn from the cavern 3 is at or below a product purity specification.

The frequency of cycling the cavern 3 may be greater before operation or during start-up, but then decrease as the amount of entrapped contaminants is reduced during cavern operation. Alternatively, it should be understood that additional fresh or unsaturated brine 245 from reservoir 244 may be introduced into the cavern 3 only when impurities are detected to rise at or above a product purity specification during operation. Such a mode of operation may be preferred when the cavern 3 was previously cycled one or more times prior to start-up of the cavern 3.

The present invention also contemplates selective cycling of the cavern 3. In other words, one or more purging operations may be required only in certain instances, such as, for example, when one or more contaminants from the crude hydrogen stream 21 are measured to be above a product purity specification and/or when concentration measurements within the interior region of the region indicates an upward trending of one or more contaminants. Alternatively, the purging can be performed as part of a scheduled preventive maintenance protocol; when the cavern is temporarily shut down; or prior to operating the cavern 3. As such, the purging method of the present invention allows an in situ real-time approach for handling unexpected rises in contaminants within the cavern 3.

It should be understood that various modifications to the present invention are contemplated without departing from the spirit and scope of the present invention. For example, a portion of the hydrogen product that is removed as hydrogen stream 13 from a pipeline 2 may be sufficiently pressurized, thereby eliminating a need for its compression. Particularly, a portion of the hydrogen product that is removed from the hydrogen pipeline 2 can bypass the compressor 7, and then introduced into the salt cavern 3. As the pressure in the cavern 3 increases and begins to deviate from predetermined compression requirements (e.g., pressure in the cavern 3 approaches or exceeds the pressure in the hydrogen pipeline 2), additional hydrogen product which is removed from the hydrogen pipeline 2 may require pressurization and can therefore be compressed by the compressor 7 prior to its introduction into the salt cavern 3. Additionally, it should be understood that stored hydrogen 4 can be withdrawn from the cavern 3 and re-routed to the compressor 7, if required to pressurize the withdrawn hydrogen to a sufficient pressure equal to or greater than the pressure of the pipeline 2. In this manner, the compressor 7 can be selectively utilized to introduce hydrogen product into the cavern 3 and withdraw stored hydrogen 4 from the cavern 3, as necessary during operation of the cavern 3.

While the present invention has been described in relation to the ability to store hydrogen at purity grades of preferably about 95% and higher, it should be understood that the principles of the present invention also are applicable to storage of lower purity grades of hydrogen (i.e., below 95% purity) as well as other non-hydrogen containing gases, including inert gases, and any combination thereof.

The present invention can substantially reduce infiltration of contaminants from the salt cavern walls 203 of the salt cavern 3 when cycling the cavern 3 several times on a continuous or intermittent basis. The ability to reduce contamination of the stored hydrogen gas 4 can in some instances eliminate the need for implementation of purification equipment upon withdrawal of the stored hydrogen gas 4 from the salt cavern 3. The need for less contaminant removal can lower capital and operating costs associated with surface purification equipment. For example, the required sizing of adsorption beds in the present invention would be potentially smaller than of conventional storage caverns, as less contaminants would be required to be removed upon withdrawal of the stored hydrogen 4 from salt cavern 3 as a crude hydrogen stream 21 to achieve a product purity specification. This is in contrast to conventional storage caverns, where the porosity of the salt walls 203 due to cavern instability may contribute to the release and infiltration of a larger amount of contaminants from the salt walls 203 into the interior cavity of the cavern 3, thereby requiring larger purification units (e.g., adsorption units). As a result, the present invention offers a process benefit of substantial reduction in cost and complexity of operating the salt cavern 3.

It should be understood that the present invention contemplates hydrogen product may be removed from various hydrogen sources. By way of example, hydrogen product may be removed from a hydrogen production source, such as one or more stream methane reformers, and thereafter introduced by a hydrogen pipeline into the salt cavern 3. In another example, the hydrogen product may be removed from a hydrogen recovery plant and directed by a hydrogen pipeline into the salt cavern 3. Alternatively, hydrogen product may be removed from any type of hydrogen storage source and routed by a hydrogen pipeline into the salt cavern 3.

One of the benefits of the present invention is that withdrawal of the stored hydrogen 4 can occur even in the presence of mixing at the interfacial boundary between the stored hydrogen 4 and the brine 215 at the bottom portion 207 of the cavern 3. Any transfer of carbon dioxide from the brine 215 to the stored hydrogen 4 upon its withdrawal is believed to be substantially reduced by virtue of the cycling techniques of the present invention. As a result, the effective volume of the cavern 3 for storage of hydrogen 4 is not compromised by the presence of relatively large amounts of brine 215 contained therein on a continuous or intermittent basis during operation of the cavern 3.

While it has been shown and described what is considered to be certain embodiments of the invention, it will, of course, be understood that various modifications and changes in form or detail can readily be made without departing from the spirit and scope of the invention.

It is, therefore, intended that this invention not be limited to the exact form and detail herein shown and described, nor to anything less than the whole of the invention herein disclosed and hereinafter claimed. The described embodiments herein are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A method for reducing a concentration of one or more contaminants in a salt cavern, comprising:
   introducing a purge fluid into an interior region of the salt cavern;
   purging at least a portion of said one or more contaminants from the interior region of the salt cavern with the purge fluid, said one or contaminants comprising at least one of CO2, H2O, sulfur-containing compounds and THC; and
   reducing the concentration of said one or more contaminants within the interior region of the salt cavern such that a hydrogen stream withdrawn from the salt cavern comprises at least one of the CO2, H2O, sulfur-containing compounds and total hydrocarbons (THCs) at a concentration that is at or below a product purity specification of the hydrogen stream withdrawn from the salt cavern.

2. The method of claim 1, further comprising reducing the concentration of said one or more contaminants within the interior region of the salt cavern such that the hydrogen stream withdrawn from the salt cavern comprises the CO2 at a concentration of not more than about 5 ppm.

3. The method of claim 1, further comprising reducing the concentration of said one or more contaminants within the interior region of the salt cavern such that the hydrogen stream withdrawn from the salt cavern comprises the H2O at a concentration of not more than about 3000 ppm.

4. The method of claim 1, further comprising reducing the concentration of said one or more contaminants within the interior region of the salt cavern such that the hydrogen stream withdrawn from the salt cavern comprises the sulfur-containing compounds at a concentration of not more than about 2000 ppm.

5. The method of claim 1, further comprising reducing the concentration of said one or more contaminants within the interior region of the salt cavern such that the hydrogen stream withdrawn from the salt cavern comprises the THCs at a concentration of not more than about 5%.

6. The method of claim 1, wherein the step of purging is performed in the presence of stored hydrogen in the salt cavern.

7. The method of claim 1, further comprising:
   cycling the salt cavern with the purging of at least one or more of the contaminants contained within the interior region of the salt cavern.

8. The method of claim 1, wherein said purge fluid is selected from the group consisting of brine, hydrogen, nitrogen, air, carbon dioxide, water and any combination thereof.

9. The method of claim 1, further comprising stressing at least a portion of walls of the cavern, wherein said stressing is mechanical, thermal or a combination thereof.

10. The method of claim 9, wherein said stressing occurs by mechanical stressing, said mechanical stressing comprises reducing or raising a pressure of the cavern at a rate sufficient to create instability of at least the portion of the walls of the cavern, thereby rendering the portion of the walls susceptible-to contaminant release into the interior region of the cavern.

11. The method of claim 9, wherein the step of stressing at least a portion of the walls of the salt cavern occurs by thermal stressing.

12. The method of claim 1, wherein said purge fluid comprises (i) brine and/or (ii) low purity grade or high purity grade hydrogen.

13. The method of claim 1, wherein said hydrogen stream withdrawn from the salt cavern has a purity of about 95% or higher.

14. A method for removing one or more contaminants from a salt cavern, comprising:
- introducing fresh or unsaturated brine into the cavern;
- dissolving a portion of said one or more contaminants into the brine;
- removing hydrogen product from a hydrogen pipeline;
- compressing the hydrogen product to produce a compressed hydrogen product;
- introducing the compressed hydrogen product into the salt cavern; and
- displacing at least a portion of the brine comprising the portion of said one or more contaminants dissolved therein with the compressed hydrogen product to purge the portion of said one or contaminants from the cavern.

15. The method of claim 14, further comprising:
- returning the brine with said dissolved one or more contaminants therein to a brine pond reservoir; and
- introducing additional fresh or unsaturated brine from the brine pond reservoir into the cavern.

16. The method of claim 15, wherein the step of introducing additional fresh or unsaturated brine is performed in response to (i) detection of a brine solution in the cavern approaching saturation or at saturation; and/or (ii) detection of an increasing concentration of said one or more contaminants within the headspace of the cavern.

17. The method of claim 14, further comprising:
- mechanically stressing the cavern by accumulating a sufficient amount of the brine within the cavern so as to increase the pressure in a headspace of the cavern at a predetermined rate.

18. The method of claim 17, further comprising maintaining at least a portion of said brine within the cavern during operation of the cavern at an amount that occupies about 25 vol % or greater based on a total volume of the cavern.

19. A method for reducing a concentration of one or more contaminants in a salt cavern, comprising:
- introducing a purge fluid into an interior region of the salt cavern;
- purging at least a portion of said one or more contaminants from the interior region of the salt cavern with the purge fluid, said one or contaminants comprising at least one of $CO_2$, $H_2O$, sulfur-containing compounds and total hydrocarbons (THCs); and
- reducing the concentration of at least one of the $CO_2$, $H_2O$, sulfur-containing compounds and THCs within the interior region of the salt cavern (i) to not more than about 5 ppm $CO_2$; (ii) to not more than about 3000 ppm $H_2O$; (iii) to not more than about 2000 ppm sulfur-containing compounds; and (iv) to not more than about 5% total hydrocarbons (THCs).

20. The method of claim 19, further comprising reducing the concentration within the interior region of the salt cavern of (iii) the sulfur-containing compounds to not more than about 2000 ppm; and (iv) the THCs to not more than about 5%.

21. The method of claim 19, further comprising reducing the concentration within the interior region of the salt cavern of (i) the $CO_2$ to not more than about 5 ppm; (iii) the sulfur-containing compounds to not more than about 2000 ppm; and (iv) the total THCs to not more than about 5%.

22. The method of claim 19, further comprising reducing the concentration within the interior region of the salt cavern of (i) the $CO_2$ to not more than about 5 ppm; and (iii) the sulfur-containing compounds to not more than about 2000 ppm.

23. The method of claim 19, further comprising reducing the concentration within the interior region of the salt cavern of (i) the $CO_2$ to not more than about 5 ppm; and (iv) the total THCs to not more than about 5%.

24. The method of claim 19, wherein said purge fluid comprises brine, low purity grade hydrogen, high purity grade hydrogen, nitrogen, air, carbon dioxide, water or any combination thereof.

* * * * *